(12) United States Patent
Hino et al.

(10) Patent No.: US 8,119,182 B2
(45) Date of Patent: Feb. 21, 2012

(54) CHOCOLATE DRINKS AND METHOD FOR THEIR PRODUCTION

(75) Inventors: Yoshiko Hino, Osaka (JP); Yoshiaki Yokoo, Osaka (JP); Kenzo Takahashi, Osaka (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 890 days.

(21) Appl. No.: 10/519,538

(22) PCT Filed: Jun. 17, 2003

(86) PCT No.: PCT/JP03/07653
§ 371 (c)(1),
(2), (4) Date: Dec. 28, 2004

(87) PCT Pub. No.: WO2004/002243
PCT Pub. Date: Jan. 8, 2004

(65) Prior Publication Data
US 2006/0034999 A1 Feb. 16, 2006

(30) Foreign Application Priority Data

Jun. 28, 2002 (JP) .................................. 2002-189617
Sep. 25, 2002 (JP) .................................. 2002-280090

(51) Int. Cl.
*A23L 2/38* (2006.01)
(52) U.S. Cl. ......................................... 426/593; 426/93
(58) Field of Classification Search .................. 426/593
See application file for complete search history.

(56) References Cited

U.S. PATENT DOCUMENTS

| | | | | |
|---|---|---|---|---|
| 2,957,769 | A | * | 10/1960 | Rusoff .......................... 426/254 |
| 4,343,818 | A | * | 8/1982 | Eggen ............................. 426/45 |
| 4,349,579 | A | * | 9/1982 | Raboud et al. ................ 426/631 |
| 4,758,444 | A | * | 7/1988 | Terauchi et al. .............. 426/593 |
| 4,871,562 | A | * | 10/1989 | Terauchi et al. ........... 426/330.3 |
| 4,970,090 | A | * | 11/1990 | Zeiger et al. ................. 426/650 |
| 5,389,394 | A | * | 2/1995 | Weyersbach et al. ......... 426/593 |

FOREIGN PATENT DOCUMENTS

| | | | |
|---|---|---|---|
| DE | 2342177 | | 12/1972 |
| DE | 4139817 A1 | | 12/1991 |
| JP | 51-054957 A | | 5/1976 |
| JP | 551-54957 A | | 5/1976 |
| JP | H01-231879 | | 9/1989 |
| JP | 01-252273 | | 10/1989 |
| JP | 02-219543 | | 9/1990 |
| JP | 03-094640 A | | 4/1991 |
| JP | 06-292544 | * | 10/1994 |
| JP | 6292544 | * | 10/1994 |
| JP | 07-079749 A | | 3/1995 |
| JP | H07-123934 | | 5/1995 |
| JP | H09-75003 A | * | 7/1995 |
| JP | 08-332063 A | | 12/1996 |
| JP | H08-332063 A | | 12/1996 |
| JP | 09075003 | * | 3/1997 |
| JP | H09-503917 | | 4/1997 |
| JP | 09-075003 A | | 7/1997 |
| JP | H10-229821 A | | 9/1998 |
| WO | WO 95/10946 | | 4/1995 |

OTHER PUBLICATIONS

Minifie, B. W. 1980. Chocolate, Cocoa and Confectionery, 2$^{nd}$ edition, AVI Publishing, Co, Inc., Westport, CT. p. 69.*
Perry, R. H. 1973. Perry's Chemical Engineers' Handbood, 6th edition. McGraw-Hill, New York, p. 19-91-19-94.*
Hall, Carl. 1971. Encyclopedia of Food Engineering. vol. 1 The AVI Publishing Company, Inc. Westport, CT. p. 418-423.*
Johnson, A. et al., 1974. Encyclopedia of Food Technology. vol. 2 The AVI Publishing Company, Inc. Westport, CT. p. 499-501.*
Francis, F., editor. 2000. Food Science and Technology, vol. 1, 2nd edition, John Wiley & Sons, Inc., New York, p. 282-286.*
Francis, F.J. 2000. Encyclopedia of Food Science and Technology, vol. 2, 2nd edition. John Wiley & Sons., Inc., New York. p. 1289-1294.*
*Chocolate riyou shyokuhin no hyouji ni kansuru jouseikyousoukiyaku* (Japanese fair competition rule concerning the labeling of chocolate-based foods), The Japan Fair Trade Commission, Dec. 20, 1991, Chuohoki Publishers.
M. Uchino et al, *Chocolate, cocoa Gijutsu Kouza* (Chocolate and cocoa technology course), pp. 7 and 13, Apr. 15, 1981, Shibata Publishing Co., Ltd.
Supplemental European Search Report issued Oct. 24, 2008, in European Patent Application No. 03736224.1-2114/1537790.
Meursing E.H., "The Flavor of Cocoa Powder," The Manufacturing Confectioner, pp. 43-46 (Oct. 1980).
Fujita, *Shokuyo-yushi* (*Edible fat and oil*), Apr. 5, 2000 by Saiwa Shobo, pp. 18-21, 36-37, 110-111, and 182-187; w/partial translation for p. 185 (blocked paragraph).
Fujita, *Shokuhin Kako Gijutsu* (*Food processing technology*), vol. 19, No. 2, pp. 73-80 (1999); partial translation for p. 75, Table 2.

* cited by examiner

*Primary Examiner* — Carolyn Paden
(74) *Attorney, Agent, or Firm* — Drinker Biddle & Reath LLP

(57) ABSTRACT

The present invention provides a method for producing a chocolate drink having a smooth texture in the mouth without graininess, a refreshing aftertaste and also an excellent and rich flavor.
More specifically, the present invention provides a method for producing a chocolate drink, which comprises the step of extracting cacao nibs with water and the step of removing insoluble solids from the extract, wherein the liquid temperature in both steps is set at a temperature higher than the melting point of cacao fat/oil. Thus, the present invention enables the provision of cacao fat/oil-rich chocolate drinks, in which the formation of precipitates is inhibited and no solidification of cacao fat/oil occurs during storage. The chocolate drinks have a smooth texture in the mouth without graininess, a refreshing aftertaste, and also an excellent flavor.

18 Claims, No Drawings

CHOCOLATE DRINKS AND METHOD FOR THEIR PRODUCTION

FIELD OF THE INVENTION

The present invention relates to chocolate drinks. More specifically, the present invention relates to a method for producing fat/oil-rich chocolate drinks, which comprises the step of extracting cacao nibs with water and the step of removing insoluble solids from the extract, wherein the liquid temperature in both steps is set at a temperature higher than the melting point of cacao fat/oil.

RELATED ART

Chocolate drinks are defined to mean drinks which are produced from chocolate sources by supplementing, as needed, with sweeteners, dairy products, edible fats and oils, flavorings and other edible materials, followed by mixing and homogenization to be provided directly or in a diluted form for drinking purposes, and have a cacao content of 0.5% or more, based on the total weight ("Chocolate riyou shyokuhin no hyouji ni kanusuru kouseikyousoukiyaku (Japanese fair competition rule concerning the labeling of chocolate-based foods)"). Moreover, chocolate drinks are also called cocoa beverages, chocolate beverages or cocoa drinks. Among them, well known are cocoa beverages made by dissolving and dispersing cocoa powder [i.e., powered cacao beans, which have been previously roasted, crushed, alkali-treated and then defatted to remove part of their fat and oil (cacao butter)] as a chocolate source. Containers used for holding these drinks include cans, paper packs, etc.

However, cocoa beverages made from cocoa powder have involved several problems. Namely, insoluble solids such as cocoa powder-derived fibers constitute fine particles which disperse in the beverages, thereby providing a dusty feel and a grainy texture in the mouth when drinking. In addition, stabilizers such as cellulose powder, which are added to prevent precipitation of insoluble solids (i.e., to stabilize the ingredients contained), would affect the flavor of beverages to give a non-refreshing aftertaste, thus making it difficult to drink the beverages. Further, such cocoa beverages have been difficult to market when filled into transparent containers (e.g., PET bottles) because they tend to cause precipitation under long-term storage and thus their commercial value is reduced when they are in containers whose interior is visible from outside. Furthermore, upon long-term storage at low temperature, there arises an additional problem that cacao fat/oil may be concentrated at the surface and solidified there.

One possible course to resolve these problems is a method for production of a cocoa beverage in which precipitation is prevented, which method involves using cocoa powder as a chocolate source and removing insoluble solids from a solution/dispersion of the cocoa powder. However, insoluble solids in cocoa powder constitute fine particles and such fine particles are extremely difficult to remove, thus making difficult the industrialization of this process.

For this reason, another method for production of chocolate drinks has been disclosed, in which instead of cocoa powder, cacao nibs are used as a chocolate source. Cacao nibs are also called albumen cocoa nibs and refer to a crushed product (albumen) of cacao beans, which is obtained by roasting and crushing cacao beans and then removing their shells and embryos, etc.

JP 3-94640 A discloses a method for preparing a cocoa extract, which involves extracting cocoa with water at a relatively high temperature and then separating the resulting water-soluble extract from the remaining cocoa free from water-soluble components. Thus, this document discloses a method for production of chocolate beverages, which involves a step of obtaining a non-fat water-soluble extract free from cacao fat/oil, and which provides a chocolate beverage with an easy-to-drink texture in the mouth.

On the other hand, JP 7-79749 A discloses a method for production of a chocolate beverage, which involves dissolving and dispersing cocoa powder in an extract of cacao nibs or cacao mass (ground cacao nibs) to provide a chocolate beverage having not only a rich chocolate flavor, but also a light and easy-to-drink texture in the mouth. This method is intended to obtain an extract substantially free from cacao fat/oil by performing the extraction at low temperature such that the solidification of cacao fat/oil during storage can be prevented.

However, these chocolate drinks substantially free from cacao fat/oil are not satisfactory in terms of delicious taste or flavor provided by cacao fat/oil although they have a light and smooth texture in the mouth.

In view of the foregoing, there has been a need to provide a method for production of chocolate drinks that are substantially free from the risk of precipitation, are prevented or inhibited from the solidification of cacao fat/oil during storage, and have an excellent and rich flavor.

SUMMARY OF THE INVENTION

The object of the present invention is to provide a method for producing a chocolate drink that has a smooth texture in the mouth without graininess, a refreshing aftertaste, and an excellent and rich flavor.

DETAILED DESCRIPTION OF THE INVENTION

To achieve the above object, the inventors of the present invention have made extensive and intensive efforts to study influences of various components or precipitation of chocolate drinks on the flavor and aftertaste of the drinks. As a result, they have concluded that chocolate drinks being free from insoluble solids and having a high cacao fat/oil content show preferred properties, and hence they have made a further study on how to produce such drinks.

Namely, in the production of chocolate drinks, which involves extracting cacao nibs with water and then removing insoluble solids from the extract, the inventors of the present invention have focused their attention on the extraction step and the insoluble solid removal step (which has been performed at a temperature as low as possible to remove low-melting point components), and they have also made detailed examination to study influences of temperature conditions on the degree of precipitation and the content of fat and oil. As a result, they have surprisingly found that, when the liquid temperature in both steps (i.e., the step of extracting cacao nibs with water and the step of removing insoluble solids) is set at a temperature higher than the melting point of cacao fat/oil, it is possible to produce cacao fat/oil-rich chocolate drinks, in which the formation of precipitates is inhibited and no solidification of cacao fat/oil occurs during storage. The chocolate drinks thus produced not only have a smooth texture in the mouth without graininess because they are free from insoluble solids, but also have a refreshing aftertaste because they are not supplemented with any stabilizer intended for preventing precipitation. They further have an excellent flavor because of their high cacao fat/oil content.

The present invention will be described in more detail below.

(1) Step of Extracting Cacao Nibs

In the present invention, cacao nibs are intended to mean a crushed product (albumen) of cacao seeds (called cacao beans), which is obtained by isolating cacao seeds from cacao pods of cacao trees (scientific name: Theobroma Cacao lin.), roasting and crushing them and then removing their shells and embryos, etc. (Chocolate, cocoa Gijutsu Kouza (Chocolate and cocoa technology course), pages 7 and 13, 1981, Shibata Publishing Co., Ltd.). Although cacao nibs may or may not be alkali-treated, alkali-treated ones are preferred for use. Likewise, although they may be either roasted or fresh, roasted ones are preferred for use. Further, cacao nibs partially containing the shells and embryos may also be used. In general, cacao nibs contain about 50% to 60% (w/w) cacao fat/oil (also called cacao butter). It should be noted that ground cacao nibs are referred to as cacao mass. In the present invention, there is no particular limitation on the production region and the cultivar of cacao used as a source material for cacao nibs. It is possible to use various cultivars grown in various regions, such as Criollo, Forastero and Trinitario.

The particle size of cacao nibs is not limited in any way. However, fine particles are difficult to separate, whereas large ones will reduce the extraction efficiency. For this reason, it is preferred that the ratio of fine particles passing through 30 mesh (aperture: 0.5 mm) is 20% or less by weight, while the ratio of large particles not passing through 10 mesh (aperture: 1.7 mm) is 40% or less by weight. It is more preferred that the ratio of fine particles passing through 30 mesh is 10% or less by weight, while the ratio of large particles not passing through 10 mesh is 30% or less by weight.

Procedures for extraction from cacao nibs are not limited in any way, and are exemplified by the drip method, the column method, etc.

As used herein, the term "cacao fat/oil" is intended to mean a fat/oil component derived from cacao nibs. This component is primarily composed of glycerine esters of fatty acids such as stearic acid and palmitic acid. Although cacao fat/oil may comprise any of several types of different ingredients, its melting point is approximately 28° C. to 40° C., which will vary depending on differences in the composition of ingredients.

The extraction of cacao nibs is accomplished by using a solvent such as water. In the present invention, it is important to perform the extraction step at a temperature allowing extraction of cacao fat/oil (a component providing delicious taste or flavor of chocolate drinks), i.e., at a temperature higher than the melting point of cacao fat/oil. This allows most of the cacao fat/oil to be transferred to the extract. More specifically, the temperature of an extraction solvent is preferably 28° C. to 95° C. In terms of improvement in extraction efficiency, the temperature is preferably 40° C. to 95° C., and more preferably 60° C. to 95° C.

The amount of water used for extraction can be determined as appropriate to ensure efficient extraction of cacao nib components. For example, water may be used in 10- to 100-fold excess (by weight) over cacao nibs.

Likewise, the extraction time can be determined as appropriate to ensure efficient extraction of cacao nib components at each selected liquid temperature, or may be determined in consideration of influences on beverage flavor. For example, the extraction time may be set in the range of 5 to 60 minutes at a liquid temperature of 95° C., while the extraction time may be set in the range of 5 minutes to 24 hours at a liquid temperature of 40° C.

(2) Step of Removing Insoluble Solids

Removal of insoluble solids may be accomplished in any manner commonly used; for example, by using a strainer, a cyclone, centrifugation, filtration or other techniques, which may be used in combination as appropriate. By way of example, the cacao nib extract obtained through extraction with water (90-95° C.) may be passed through a strainer (mesh size: 40-60) to effect a rough separation of insoluble solids, and then treated in a disk centrifuge for two-phase (solid-liquid) separation to remove insoluble solids before being subjected to a homogenization step.

In the present invention, it is important to perform the removal of insoluble solids from the cacao nib extract at a liquid temperature allowing extraction of cacao fat/oil (a component providing delicious taste or flavor to chocolate drinks), i.e., at a temperature higher than the melting point of cacao fat/oil. This allows most of the cacao fat/oil to remain in the extract. More specifically, it is desirable to use a temperature condition of 28° C. to 95° C., preferably 40° C. to 95° C., in terms of the melting point of cacao fat/oil and prevention of excessive water evaporation. However, in terms of prevention of quality loss, a long-term storage at high temperature should be avoided; and more preferably, it is desirable to use a temperature condition of 40° C. to 70° C.

Any apparatus may be used for temperature control, as exemplified by, but not limited to, standard temperature control units or vessels, such as a plate heat exchanger or a jacketed tank.

Conditions other than the liquid temperature used for removal of insoluble solids may be determined as appropriate depending on the type of apparatus to be used and the intended volume of liquid, etc.

The cacao nib extract after removal of insoluble solids preferably has a cacao fat/oil content of 1 g to 200 g, more preferably 1 g to 50 g, when calculated per kg of cacao nibs before being extracted.

Although it is important to perform each of the extraction step and the insoluble solid removal step at a liquid temperature higher than the melting point of cacao fat/oil, the liquid temperature in these steps may further be determined as appropriate to control the composition of components to be contained in drinks with the aim of imparting the intended flavor to the drinks. In order that drinks contain desired components, it is important to appropriately select the liquid temperature in one of these two steps, which is performed at a lower temperature.

By way of example, in a case where one of the steps is performed at a liquid temperature of 95° C. and the liquid temperature in the other step is set at 40° C., the resulting drinks can contain high purity of cacao fat/oil having a melting point of 30° C. to 40° C. while eliminating various components having melting points exceeding 40° C. Likewise, in a case where the liquid temperature in the step performed at a lower temperature is set at 70° C., the resulting drinks can contain, in addition to cacao fat/oil, other components having melting points lower than 70° C. Likewise, in a case where the liquid temperature in the step performed at a lower temperature is set at 30° C. to 35° C., the resulting drinks can contain only specific low-melting point ingredients of cacao fat/oil while eliminating components having melting points higher than 35° C.

The step performed at a lower temperature may be either the extraction step or the insoluble solid removal step. Alternatively, both of them may be performed at the same liquid temperature. However, since the extraction step at a moderately high temperature leads to an efficient extraction, it is more preferable to effect the insoluble solid removal step at a lower temperature.

(3) Homogenization Step

In a preferred embodiment of the present invention, a homogenization step is performed on the cacao fat/oil-containing cacao nib extract obtained after removal of insoluble solids. Any type of apparatus may be used in the homogenization step as long as it ensures uniform emulsification. For example, a standard homogenizer may be used at a pressure of about 50-200 kg/cm$^2$ to effect homogenization. To obtain a uniform liquid, the liquid temperature is preferably set at a temperature higher than the melting point of cacao fat/oil. For example, while maintaining the temperature at 38° C. to 95° C., the cacao nib extract may be homogenized to give a stable cacao fat/oil-containing cacao nib extract.

To confirm uniform emulsification, the treated liquid may be measured for its particle size distribution using a standard particle size distribution analyzer. For example, when the particle size distribution in the treated liquid is analyzed and expressed as a volume frequency (%) using a particle size distribution analyzer LS230 (Coulter, measurement range is 0.01 to 10,000 μm), a sharp major peak will be observed at a particle diameter of several microns if uniform emulsification is achieved.

In the present invention, milk-derived ingredients may also be added depending on the design of the intended drinks. Examples of milk-derived ingredients include, but are not limited to, cow milk, skimmed milk powder and whole milk powder. Among them, cow milk is preferred for use in terms of improvement in taste. If special consideration is required to prevent solidification of cacao fat/oil during storage, skimmed milk powder is preferred because of its low milk fat content. The amount of milk-derived ingredients to be added is preferably 0.1% to 50% (v/v) in the case of cow milk and 0.01% to 7% (w/v) in the case of skimmed milk powder, relative to a final chocolate drink. Preferably, the step of adding milk-derived ingredients follows the step of removing insoluble solids. Above all, it is desirable to effect this step prior to the homogenization step.

Likewise, prior to the homogenization step, cacao butter may be added to adjust the fat/oil concentration, if necessary. Namely, the cacao extract may be supplemented with melted cacao butter and then homogenized to adjust the fat/oil concentration. The cacao extract supplemented with cacao butter preferably has a fat/oil content of 20 mg/L to 20 g/L, more preferably 50 mg/L to 2 g/L (by weight), when calculated as the sum of cacao- and cacao butter-derived fat/oil contents relative to a final chocolate drink. Milk-derived ingredients and cacao butter may be added in any order or simultaneously, as long as they are added prior to the homogenization step.

In a preferred embodiment of the present invention, a liquid temperature higher than the melting point of cacao fat/oil may be consistently used throughout all steps: (1) the extraction step; (2) the insoluble solid removal step; and (3) the homogenization step. For example, these steps may be performed at 38° C. to 95° C., and more preferably at 40° C. to 95° C.

(4) Finishing Step

After obtaining the stable fat/oil-rich cacao nib extract in this way, the temperature may be reduced to 40° C. or below and the extract may be mixed in a standard manner with sweeteners (e.g., sugar) and secondary source materials (e.g., flavorings, colorants, emulsifiers, water), followed by re-homogenization, sterilization and filling into containers to prepare the chocolate drinks of the present invention.

Moreover, the present invention enables the provision of chocolate drinks without any risk of precipitation even when incorporating substantially no stabilizers or only a limited amount of stabilizers (e.g., cellulose powder), which have been added to conventional cocoa beverages made from cocoa powder for the purpose of precipitation prevention (i.e., ingredient stabilization). However, when needed, stabilizers may be incorporated within a range which does not adversely affect the aftertaste.

Although cacao fat/oil is homogenized and thus highly stable in the drinks of the present invention, emulsifiers such as sucrose fatty acid esters may be added within a range not affecting the taste with the aim of preventing solidification of fat/oil components at the surface during storage in certain cases, such as where high-fat milk-derived ingredients are incorporated or where storage under severe conditions is intended.

(5) Characteristics of Drinks

The chocolate drinks thus obtained are substantially free from the risk of precipitation, are prevented or inhibited from the solidification of cacao fat/oil during storage, and also have a high fat/oil content.

Thus, the present invention enables the production of excellent chocolate beverages characterized by: 1) having a smooth texture in the mouth because they are free from insoluble solids; 2) having a good refreshing aftertaste because they require no stabilizer; and 3) having a rich cacao flavor because, if desired, they may have a high content of cacao nib-derived flavor- and taste-enhancing components (fat/oil components).

Containers used for holding the chocolate drinks of the present invention include cans, paper packs, PET bottles, etc. In particular, transparent containers such as PET bottles can be used preferably for this purpose, which have not been usable for conventional cocoa beverages made from cocoa powder due to the problem of precipitation.

EXAMPLES

The present invention will be further described in more detail in the following examples, which are not intended to limit the scope of the invention.

Example 1

Three types of canned chocolate drinks were prepared. Cacao nibs obtained from cacao beans through alkali-treatment, roasting and crushing were used as a chocolate source to prepare a cacao fat/oil-rich and milk-containing chocolate drink (Trial Product 1). On the other hand, the cacao nib extract was defatted to prepare a milk-containing chocolate drink (Control Product 1). Further, cocoa powder was used as a chocolate source to prepare a milk-containing cocoa beverage, in which the cocoa powder was dissolved and dispersed (Control Product 2).

More specifically, 1.0 kg of cacao nibs {cacao fat/oil content: 55% (w/w); ingredients other than cacao fat/oil: 0.45 kg} were extracted with 20 L hot water (90-95° C.) for 20 minutes, passed through a stainless mesh (200 mesh, average pore size: 75 μm) to effect a rough separation of insoluble solids, adjusted to a temperature of 60° C. to 70° C., and then treated in a disk centrifuge for two-phase (solid-liquid) separation to remove the solid phase (insoluble solids), followed by collecting the liquid phase to give a cacao fat/oil-containing cacao nib extract (18 L). Next, while maintaining the temperature of this extract at 40° C. to 50° C., the extract was mixed with 5 kg of cow milk as a milk-derived ingredient, and then homogenized using a homogenizer at a pressure of about 150 kg/cm$^2$ to give a stable cacao fat/oil-containing cacao nib extract. After the temperature was reduced to 40° C. or below, the extract was supplemented with 7 kg of sucrose-type liquid sugar (sugar content: 68°) as a sweetener together with a secondary source material (flavorings), adjusted with pure water to a total volume of 50 L, and then homogenized again at a pressure of about 100 kg/cm², followed by filling and sterilization to prepare a 190 g canned milk-containing chocolate drink (Trial Product 1).

Likewise, the same procedure as used for preparation of Trial Product 1 was repeated to prepare a 190 g canned milk-containing chocolate drink (Control Product 1), except that the cacao nib extract after the rough separation of insoluble solids was treated in a disk centrifuge for three-phase (liquid-liquid-solid) separation at 25° C. to 30° C. to remove the solid phase (insoluble solids) and one liquid phase (oil phase), followed by collecting the other liquid phase (aqueous phase).

Further, instead of cacao nibs, cocoa powder was used as a chocolate source to prepare a chocolate drink (Control Product 2) in such a manner that the amount of cacao-derived ingredients (excluding cacao fat/oil) contained in the cocoa powder used as a source material for Control Product 2 was equal to that of the source material for Trial Product 1 (0.45 kg) so as to prevent its flavor from being affected by the amount of cacao-derived ingredients other than cacao fat/oil. More specifically, 0.56 kg of cocoa powder {cacao fat/oil content: 20% (w/w); the amount of ingredients other than cacao fat/oil: 0.45 kg} was dissolved and dispersed in 20 L hot water (93° C.), supplemented with 5 kg of cow milk and then homogenized. Then, sweetener addition and subsequent steps were performed in accordance with the procedure as used for preparation of Trial Product 1, to prepare a conventional 190 g canned milk-containing cocoa beverage (Control Product 2).

Trial Product 1 and Control Products 1 and 2 were first cooled to about 10° C. and evaluated in the form of so-called "iced cocoa" in a sensory test by expert panelists. The sensory test was performed by five expert panelists using a scoring method on a five-point scale (5=good, 4=relatively good, 3=ordinary, 2=relatively poor, 1=poor) to calculate an average score for each sample.

Table 1 shows the results obtained. The score from the sensory test was highest in Trial Product 1, which received 4.2 points. When evaluated for their qualities, Trial Product 1 was found to have characteristics desired in the present invention, i.e., a light and easy-to-drink texture as well as a rich and deep taste.

TABLE 1

|  | Score in sensory test | Characteristics |
| --- | --- | --- |
| Trial Product 1 | 4.2 | Light and easy to drink, as well as rich and deep |
| Control Product 1 | 3.0 | Light and easy to drink, but relatively tasteless and not satisfactory |
| Control Product 2 | 3.2 | Relatively dusty and difficult to drink |

Next, the extracts and solution obtained in the production of Trial Product 1 and Control Products 1 and 2 were each analyzed to determine the cacao fat/oil content before addition of the milk-derived ingredient. The fat/oil content was analyzed by measuring the weight of each n-hexane extract of these samples, and calculated per volume.

Table 2 shows the results obtained. The cacao nib-derived fat/oil content in the extract of Trial Product 1 was obtained and converted, by way of calculation, to the content of the final product, 467 mg/L. In contrast, the cacao nib-derived fat/oil content in the extract of Control Product 1 was converted to the content of the final product, 16 mg/L. Further, the cocoa powder-derived fat/oil content in the solution of Control Product 2 was converted to the content of the final product, 2000 mg/L.

TABLE 2

|  | Fat/oil content (mg/L) | |
| --- | --- | --- |
|  | In sample | Calculated data for final product |
| Trial Product 1 | 1297 | 467 |
| Control Product 1 | 44 | 16 |
| Control Product 2 | 5600 | 2036 |

In addition, Trial Product 1 and Control Products 1 and 2 were evaluated for the amount of insoluble solids. More specifically, each sample was allowed to stand at room temperature for 3 hours and then stirred; 10 ml of each sample was then sampled in a graduated centrifuge tube and measured for the volume of insoluble solids after centrifugation at 3,000 revolutions for 10 minutes.

Table 3 shows the results obtained. The amount of insoluble solids was less than 0.05 (ml/10 ml) in Trial Product 1 and Control Product 1, but 0.10 (ml/10 ml) in Control Product 2.

The results of the flavor evaluation shown in Table 1 will be discussed in view of Tables 2 and 3.

It is believed to be due to the low content of insoluble solids of Trial Product 1 and Control Product 1 that they were evaluated to have a light and easy to drink texture in the flavor evaluation. When comparing them, Trial Product 1 according to the present invention has a higher fat/oil content than Control Product 1, and this is believed to be the reason why Trial Product 1 received a higher score and was characterized by higher qualities (i.e., a rich and deep taste) in the sensory test. In contrast, Control Product 2 has a high fat/oil content, but also contains a large amount of insoluble solids, and this is believed to be the reason why Product 2 was evaluated to be relatively dusty and difficult to drink in the flavor evaluation.

TABLE 3

|  | Insoluble solids (ml/10 ml) |
| --- | --- |
| Trial Product 1 | <0.05 |
| Control Product 1 | <0.05 |
| Control Product 2 | 0.10 |

Example 2

Three types of PET-bottled milk-containing chocolate drinks were prepared.

More specifically, the same procedure as used in Example 1 was repeated to prepare liquids to be filled in a container, except for using a different type of container for holding the drinks. After sterilization, the liquids were filled under aseptic conditions to prepare the following samples bottled in 300 ml transparent PET bottles: Trial Product 2 (corresponding to Trial Product 1); Control Product 3 (corresponding to Control Product 1); and Control Product 4 (corresponding to Control Product 2).

Trial Product 2 and Control Products 3 and 4 were evaluated for the occurrence of precipitation under two storage conditions, i.e., cold storage conditions intended for refrigeration storage in showcases at convenience stores or elsewhere (about 10° C., 2 weeks) and hot storage conditions intended for hot storage in vending machines (about 50° C., 1 week).

The degree of precipitation was visually evaluated on a three-point scale (1=not detectable, 2=slightly detectable, 3=detectable).

As a result, no precipitation was observed in any of the products immediately after production. The results obtained after storage are shown in Table 4. No precipitate was observed in either Trial Product 2 or Control Product 3 even under cold and hot storage conditions. In contrast, Control Product 4 showed slight precipitation under cold storage conditions and showed a clearly detectable degree of precipitation under hot storage conditions, thus significantly reducing its commercial value.

In summary, such a conventional cocoa beverage made from cocoa powder (Control Product 4) has been clearly difficult to market in a form filled into transparent PET bottles because there is a problem of precipitation, whereas the chocolate drink according to the present invention (Trial Product 2) is almost free from the risk of precipitation and can be sold without reducing its commercial value even when filled into transparent containers such as PET bottles.

TABLE 4

| | Degree of precipitation | |
| --- | --- | --- |
| | Cold storage | Hot storage |
| Trial Product 2 | 1 | 1 |
| Control Product 3 | 1 | 1 |
| Control Product 4 | 2 | 3 |

Example 3

Another milk-containing chocolate drink (Trial Product 3) was prepared in such a manner that a milk-derived ingredient was added after the homogenization step.

More specifically, 1.0 kg of cacao nibs (the same as used in Example 1) were extracted with 20 L hot water (60-65° C., lower than that of Example 1), subjected to a rough separation of insoluble solids, adjusted to a temperature of 40° C. to 50° C., and then treated in a disk centrifuge for two-phase separation to remove insoluble solids, thereby providing a cacao fat/oil-containing cacao nib extract (18 L). Next, while maintaining the temperature of this extract at 40° C. to 50° C., the cacao nib extract alone was homogenized at a pressure of about 150 kg/cm$^2$ to give a stable cacao fat/oil-containing cacao nib extract. After the temperature was reduced to 40° C. or below, the extract was supplemented with 5 kg of cow milk as a milk-derived ingredient and 7 kg of sucrose-type liquid sugar (sugar content: 68°) as a sweetener together with a secondary source material (flavorings), adjusted with pure water to a total volume of 50 L, and then homogenized again at a pressure of about 100 kg/cm$^2$ to prepare a 190 g canned milk-containing chocolate drink (Trial Product 3).

In the case of this chocolate drink prepared by homogenization of the cacao nib extract alone, the calculated fat/oil content of the final chocolate drink was also as high as 53 mg/L, thus resulting in a milk-containing chocolate drink having a light and easy-to-drink texture as well as an excellent and rich flavor.

Example 4

A black chocolate drink containing no milk-derived ingredient and no sweetener (Trial Product 4) was prepared in such a manner that the cacao nib extract was homogenized alone.

More specifically, the same procedure as used for preparation of Trial Product 3 (Example 3) was repeated to prepare a 190 g canned black chocolate drink (Trial Product 4), except that no milk-derived ingredient and no sweetener were added.

The calculated cacao fat/oil content of the final chocolate drink was 53 mg/L, thus resulting in a black chocolate drink having a light and easy-to-drink texture as well as an excellent and rich flavor.

After storage at 50° C. for 1 week, this drink was evaluated for the degree of precipitation in the same manner as used in Example 1. As a result, no precipitation was observed immediately after production and also after storage.

Example 5

Cacao nibs (1.0 kg, the same as used in Example 1) were extracted with 20 L hot water (85° C.) for 30 minutes, subjected to a rough separation of insoluble solids, adjusted to a temperature of 40° C. to 50° C., and then treated in a disk centrifuge for two-phase separation to remove insoluble solids, thereby providing a cacao fat/oil-containing cacao nib extract (18 L). Next, while maintaining the temperature of this extract at 40° C. or above, the extract was supplemented with 1.5 kg of skimmed milk powder as a milk-derived ingredient together with melted cacao butter (1000 g), and then homogenized at a pressure of about 200 kg/cm$^2$ to give a stable cacao nib extract containing cacao fat/oil and cacao butter. After the temperature was reduced to 40° C. or below, the extract was supplemented with a sweetener, a secondary source material, and an emulsifier which prevents the generation of suspended crystalline particles, adjusted with pure water to a total volume of 50 L, and then homogenized again at a pressure of about 110 kg/cm$^2$, followed by sterilization and filling under aseptic conditions to prepare a milk-containing chocolate drink bottled in a 300 ml transparent PET bottle (Trial Product 5).

The calculated fat/oil content of the final product of this chocolate drink was about 20 g/L, thus resulting in a milk-containing chocolate drink having a light and easy-to-drink texture as well as a deep and rich taste.

After storage at 50° C. for 1 week, this PET-bottled drink was evaluated for the degree of precipitation in the same manner as used in Example 1. As a result, no precipitation was observed immediately after production and also after storage, but the sample after being stored at 50° C. for 1 week showed a slight solidification of cacao fat/oil at the surface. However, the degree of observed solidification was low enough to be acceptable for beverages, and the solidified cacao fat/oil was readily dispersed when shaken up. Thus, it was concluded that such a slight solidification would not reduce the commercial value of this drink.

Advantages of the Invention

The chocolate drinks of the present invention are fat/oil-rich chocolate drinks having an excellent and rich flavor, which are substantially free from the risk of precipitation and are prevented or inhibited from the generation of suspended crystalline particles. Since there is substantially no risk of precipitation, these drinks can be sold without reducing their commercial value even when filled into transparent containers (e.g., PET bottles) whose interior is visible from outside, although such containers have been kept away from use for conventional chocolate (cocoa) beverages due to the problem of precipitation.

The invention claimed is:

1. A method for producing a cacao fat/oil-rich chocolate drink, which comprises:
the step of extracting cacao nibs with water, and
the step of removing insoluble solids from the extract to obtain a fat/oil-rich cacao nib extract, wherein the removal step comprises treatment of the extract obtained from the extraction step, in a disk centrifuge for two-phase (solid-liquid) separation,
wherein both steps are performed at a temperature higher than the melting point of cacao fat/oil, wherein the step of removing insoluble solids is followed by a homogenization step at a pressure of about 50-200 $kg/cm^2$, wherein the chocolate drink has a cacao fat/oil content of 20 mg/L to 20 g/L, and wherein the chocolate drink is free from the risk of precipitation.

2. The method for producing the chocolate drink according to claim 1, wherein the liquid temperature in one of the steps of extracting cacao nibs with water and of removing insoluble solids from the extract is higher than that of the other step.

3. The method for producing the chocolate drink according to claim 2, wherein the liquid temperature in the step of extracting cacao nibs with water is higher than that in the step of removing insoluble solids from the extract.

4. The method for producing the chocolate drink according to claim 1, wherein the liquid temperature in both the steps of extracting cacao nibs with water and of removing insoluble solids from the extract or at least the liquid temperature in one of these steps, which is performed at a lower temperature, is set at any temperature higher than the melting point of cacao fat/oil, so that components to be contained in the chocolate drink can be controlled to select a taste preferred for the chocolate drink.

5. The method for producing the chocolate drink according to claim 1, wherein the cacao nib extract after removal of insoluble solids has a cacao fat/oil content of 1 g to 200 g when calculated per kg of cacao nibs before being extracted.

6. The method for producing the chocolate drink according to claim 1, wherein a liquid temperature higher than the melting point of cacao fat/oil is consistently used throughout the entire process, from the extraction step of cacao nibs to the homogenization step of the cacao nib extract.

7. The method for producing the chocolate drink according to claim 1, which further comprises adding a milk-derived ingredient.

8. The method for producing the chocolate drink according to claim 7, wherein the cacao nib extract after removal of insoluble solids is mixed with a milk-derived ingredient prior to the step of homogenizing the cacao nib extract.

9. The method for producing the chocolate drink according to claim 1, wherein the cacao nib extract after removal of insoluble solids is supplemented with cacao butter prior to the step of homogenizing the cacao nib extract.

10. The method for producing the chocolate drink according to claim 1, wherein the resulting chocolate drink has a cacao fat/oil content of 50 mg/L to 20 g/L.

11. The method for producing the chocolate drink according to claim 1, wherein the chocolate drink is filled into a substantially transparent container.

12. A fat/oil-rich chocolate drink, which is obtained by the method according to claim 1.

13. The chocolate drink according to claim 12, which is filled into a substantially transparent container.

14. The method according to claim 13, wherein the cacao fat/oil-rich chocolate drink does not contain any milk-derived ingredient.

15. The method according to claim 13, wherein the cacao fat/oil-rich chocolate contains skimmed milk powder as the only milk-derived ingredient.

16. The method according to claim 1, wherein the cacao fat/oil-rich chocolate drink does not contain any milk-derived ingredient.

17. The method according to claim 1, wherein the cacao fat/oil-rich chocolate contains skimmed milk powder as the only milk-derived ingredient.

18. A method for producing a cacao fat/oil-rich chocolate drink, which comprises the step of removing insoluble solids from a hot water extract of cacao nibs to obtain a fat/oil-rich cacao nib extract, wherein the removal step comprises treatment of the hot water extract in a disk centrifuge for two-phase (solid-liquid) separation, wherein the liquid temperature in the step of removing insoluble solids from the extract is set at a temperature higher than the melting point of cacao fat/oil, wherein the step of removing insoluble solids is followed by a homogenization step at a pressure of about 50-200 $kg/cm^2$, wherein the chocolate drink has a cacao fat/oil content of 20 mg/L to 20 g/L, and wherein the chocolate drink is free from the risk of precipitation.

* * * * *